United States Patent [19]

Kastingschafer et al.

[11] Patent Number: 5,415,541
[45] Date of Patent: May 16, 1995

[54] ROTARY DRUM

[75] Inventors: Gerhard Kastingschafer; Herbert Pingel, both of Wadersloh; Johannes auf dem Venne, Ennigerloh; Bernhard Peterwerth, Bad Laer; Reinhard Giesemann, Harsewinkel, all of Germany

[73] Assignee: Krupp Polysius AG, Germany

[21] Appl. No.: 51,472

[22] Filed: Apr. 22, 1993

[30] Foreign Application Priority Data

May 18, 1992 [DE] Germany .................. 42 16 428.1

[51] Int. Cl.6 ............................................ F27B 7/00
[52] U.S. Cl. ................................. 432/103; 432/104
[58] Field of Search .................. 432/103, 104, 105

[56] References Cited

U.S. PATENT DOCUMENTS

| | | | |
|---|---|---|---|
| 3,036,823 | 5/1962 | Taylor | 432/103 |
| 3,466,936 | 9/1969 | Gaupin | 432/103 |
| 3,711,075 | 1/1973 | Raevsky | 432/103 |
| 4,344,596 | 8/1982 | Hjaeresen | 432/103 |
| 4,443,186 | 4/1984 | Shell | 432/103 |
| 4,696,116 | 9/1987 | Livingston | 432/103 |
| 4,776,788 | 10/1988 | Przewalski | 432/104 |

Primary Examiner—Henry C. Yuen
Attorney, Agent, or Firm—Learman & McCulloch

[57] ABSTRACT

The invention relates to a rotary drum with relatively large dimensions, the shell of which is supported by means of riding rings each on a pair of supporting rollers of a supporting roller stand. For this purpose the rotary drum shell merely bears two riding rings which are attached so as to be fixed against rotation and which are supported on two supporting roller stands of which at least one simultaneously forms the rotary drive arrangement for the rotary drum in the form of a friction drive. This produces a combination of features by means of which the mounting of the rotary drum is statically determinate and can be driven reliably in an extremely simple manner.

9 Claims, 3 Drawing Sheets

ROTARY DRUM

The invention relates to a rotary drum with relatively large dimensions and particularly adapted for use as a rotary kiln, a rotary cooler, and a rotary drier.

BACKGROUND OF THE INVENTION

Rotary drums of this type have relatively large dimensions as regards diameter and length and are used in practice for various applications, such as for example in rotary kilns, rotary drum coolers, rotary drum driers and the like. In these known constructions several riding rings are attached to the rotary drum shells and axially spaced from one another, each riding ring being rotatably supported on a supporting roller stand with two supporting rollers arranged symmetrically on both sides of the vertical longitudinal central axis of the rotary drum. The rotary drums of rotary kilns are frequently supported on three or more supporting roller stands distributed over the length of the rotary drum, and the co-operating supporting rollers and riding rings have smooth circumferential surfaces, the riding rings being attached to the outer circumference of the rotary drum loosely and with lubrication and with bearing plates interposed (this lubrication is necessary in order to prevent material breaks on the bearing plates). The rotary drive of these known rotary drums is generally provided by gear rings attached to the rotary drum shell and by means of driving pinions which are connected to a reduction gear and at least one drive motor. The drive arrangements thus formed not only necessitate technically demanding components, such as for example gear rings, driving pinions and the like, but also involve correspondingly high expenditure on lubrication and maintenance.

The object of the invention, therefore, is to provide a rotary drum of the type referred to which is distinguished by an economical yet reliable support as well as a simple, economical and efficient rotary drive.

SUMMARY OF THE INVENTION

Since in the construction according to the invention the rotary drum shell has only two riding rings fixed to it and this rotary drum shell is thereby mounted or supported—by its two riding rings—on two supporting roller stands, a rotary drum which is mounted in a statically determinate manner is provided in an extremely advantageous manner. In this case the rotary drive mechanism is constructed in the form of a friction drive and formed by at least one of the two, of which supporting roller stand at least one supporting roller can be driven—by at least one gear and at least one motor. Only the statically determinate mounting of the rotary drum as explained above facilitates a reliable friction drive via at least one of the supporting rollers. This results not only in a technically relatively simple rotary drive in which technically demanding components such as for example the gear ring and the driving pinion with their correspondingly high maintenance and lubrication costs (as in known constructions), but also provides the possibility of utilising at least one of the two supporting roller stands simultaneously both for mounting and for rotary drive of the associated riding ring and thus of the entire rotary drum.

It is also advantageous if at least the riding ring which takes up the rotary drive or the rotary driving moment (or also both riding rings) is constructed with internal teeth and is attached by means of its teeth to the rotary drum shell (by meshing with external teeth provided on this shell) so as to be fixed against rotation. Such a toothed fixing of the riding ring is advantageous above all in those rotary kilns which have refractory linings (brickwork) on their inner circumference which have a particularly good or long lining service life due to the limited ovalling of the shell (as a result of the chosen type of riding ring fixing) this is the case above all when the rotary drum is constructed for a rotary kiln or forms such a rotary kiln.

THE DRAWINGS

DETAILED DESCRIPTION

Figure 1:
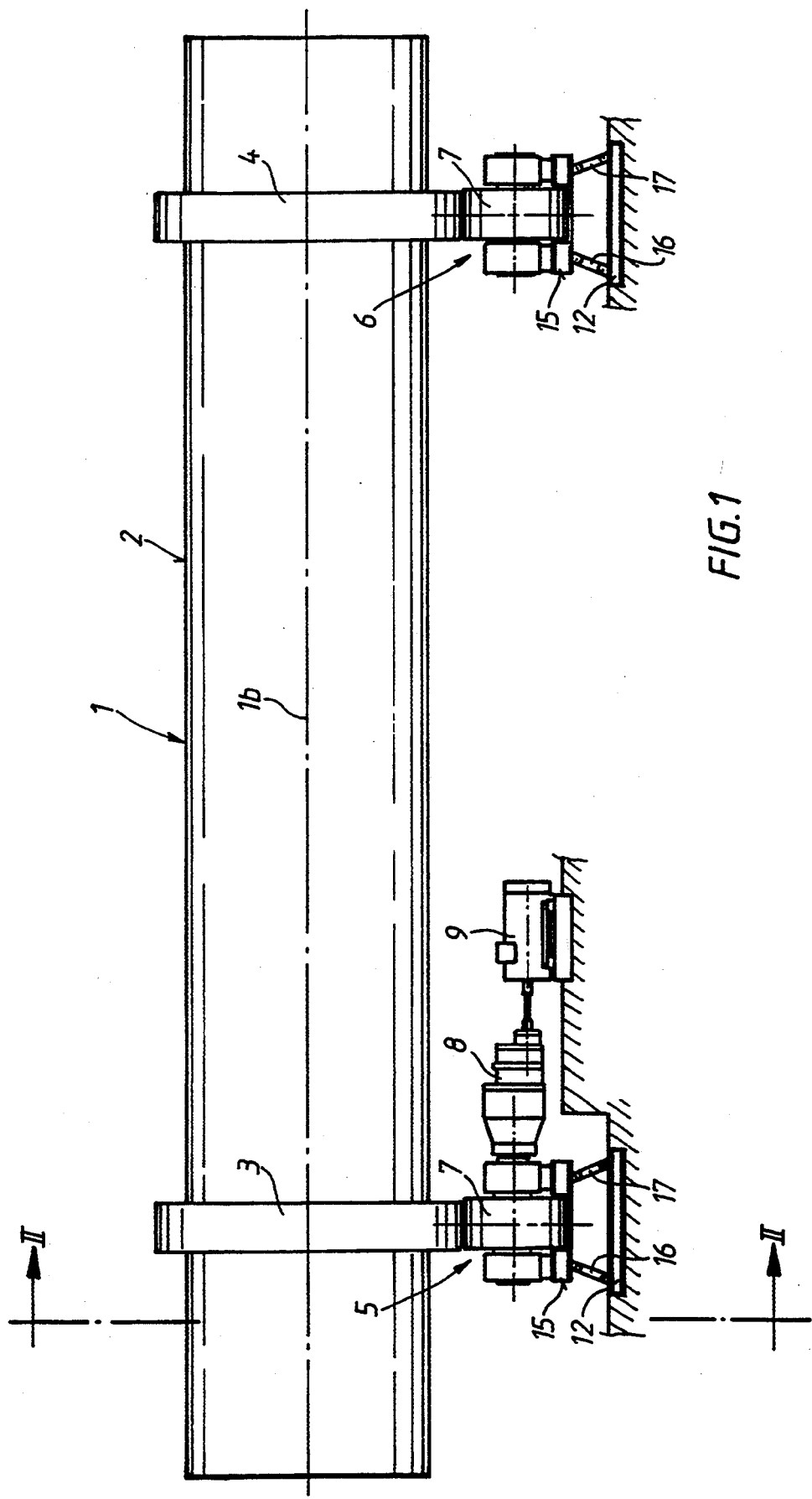
FIG. 1 is a longitudinal view of the rotary drum according to the invention which is supported on two supporting roller stands.

The rotary drum according to the invention will be explained first of all with the aid of FIGS. 1 and 2. This rotary drum 1 is preferably constructed for a rotary kiln or is itself constructed as a rotary kiln and accordingly has relatively large dimensions as regards diameter and length.

This rotary drum 1 has a substantially cylindrical shell 2 which bears two riding rings 3, 4 which are attached a suitable axial distance from one another so as to be fixed against rotation relative to the shell. By means of these two riding rings 3, 4 the rotary drum shell 2 and thus the entire rotary drum 1 is rotatably mounted or supported on two supporting roller stands 5, 6. As FIG. 2 shows, each supporting roller stand 5, 6 contains two supporting rollers 7 arranged symmetrically on both sides of the vertical longitudinal central plane 1 of the rotary drum 1. All the supporting rollers 7 of both supporting roller stands 5, 6 as well as both riding rings 3, 4 have a smooth outer circumferential surface.

The rotary drum 1 is driven in rotation about its longitudinal axis 1b by at least one rotary drive mechanism. This drive mechanism is constructed in an extremely advantageous and simple manner in the form of a friction drive and is simultaneously formed by one supporting roller stand which is provided as a supporting roller bearing or supporting roller support, namely the supporting roller stand 5, of which at least one supporting roller 7 is driven by a gear assembly 8 and a drive motor 9 coupled to the latter. Depending upon the size, construction and use of the rotary drum 1, only one supporting roller 7 or both supporting rollers 7 of the supporting roller stand can be driven in the aforementioned manner. Because of the statically determinate mounting of this rotary drum 1 on the two supporting roller stands, as already explained above, it will generally be sufficient and thus also economical to provide only one of the two supporting roller stands as a friction drive in the aforementioned manner.

Of the two riding rings 3, 4 at least the riding ring 3 which takes up the rotary drive or the rotary drive moment is constructed with internal teeth, but preferably both riding rings 3, 4 are provided with an internal toothing by means of which the riding ring is attached to the rotary drum shell 2 so as to be fixed against rotation relative to the shell. One possibility for this type of rotationally fixed attachment of the riding rings 3, 4 can be seen in FIG. 2. According to that it is sufficient for individual inwardly directed teeth 10 which together form the internal toothing to be provided at several locations uniformly distributed over the inner circumference of the riding ring (e.g. 3). In adaptation to the position and size of these teeth 10 for the internal toothing, two outwardly directed external teeth 11 which are spaced circumferentially from one another are attached in each case to the outer circumference of the rotary drum shells, and these external teeth mesh in an appropriate manner with the teeth 10 of the riding rings 3, 4.

Depending upon the construction, size and use of the rotary drum 1, the supporting rollers 7 can be tiltably or rigidly supported, These two possibilities are explained below with the aid of FIGS. 3 and 4.

Figure 3:
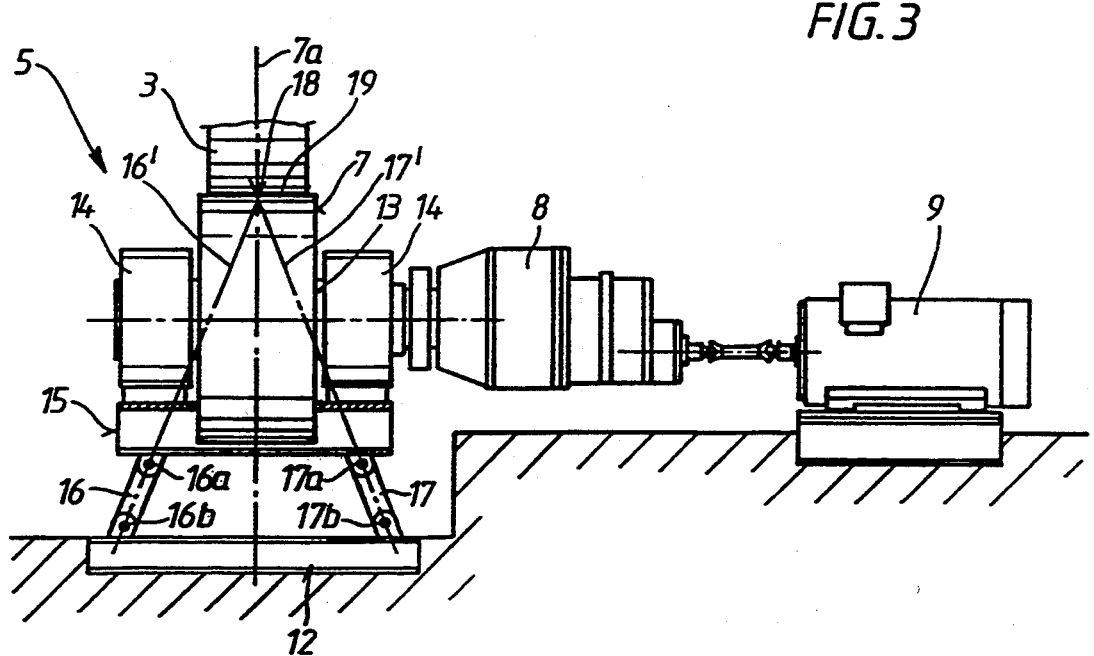
FIG. 3 is a detail view of a driven supporting roller with tiltably supported bedplate.

According to the example of FIG. 3, at least the supporting rollers 7 of supporting roller stand 5 which simultaneously forms the rotary drive arrangement are tiltably supported on a stationary supporting surface which is formed by a stationary base or foundation plate 12; however, as shown in FIG. 1, the supporting rollers 7 of both supporting roller stands 5, 6 (that is to say the supporting roller stand 5 which is simultaneously constructed as the rotary drive arrangement and the supporting roller stand 6 which merely forms a supporting roller bearing) are preferably tiltably supported.

According to the example in FIG. 3, each supporting roller 7 is mounted via its roller axle 13 in two bearings 14 (plain or anti-friction bearings) which are borne on a supporting roller bearing structure in the form of a bedplate or second member 15.

The tiltable support of each tiltable supporting roller 7 can basically be constructed in any suitable and adapted manner. However, each tiltable support of the tiltable supporting rollers 7 is preferably constructed in the form of a four-membered linkage which is formed by the stationary base member 12, the second member 15 parallel to and vertically spaced from the member 12 and two upwardly converging crank-like links 16 and 17 articulated between the bedplate 15 and the foundation plate 12, ie. the links 16, 17 have swivel joints 16a, 16b and 17a, 17b respectively at their free ends by means of which they are pivotally connected on the one hand to the bedplate 15 and on the other hand to the foundation plate 12 for rocking movements about horizontal axes transverse to the longitudinal axis 1b of the drum. The length of these rockers 16, 17 may be chosen freely, and advantageously adapted to the particular installation situation, bearing size etc.. In this case, however, the links 16, 17 preferably have equal lengths relative to the link rectangle formed by the linkage, and in their basic position they are inclined with respect to one another at the same angles in the manner shown in FIG. 3 in such a way that their imaginary extension lines 16', 17' intersect in a point of rotation 18 for this linkage. This means that the point of rotation 18 of this linkage lies in the region of the intersection or coincides with the intersection which on the one hand lies on the horizontal line of contact 19 between the supporting roller 7 and the riding ring 3 with the vertical central axis 7a of the supporting roller.

This type of tiltable support for each tiltable supporting roller 7 ensures in an extremely advantageous manner that not only is the skewing of the riding rings 3, 4 which results from assembly inaccuracies and a distorted rotary drum shell compensated but also the additional longitudinal movements of the rotary drum 1 occurring as a result of angular deviations of these riding rings 3, 4 are at least reduced to an acceptable minimum.

Figure 2:
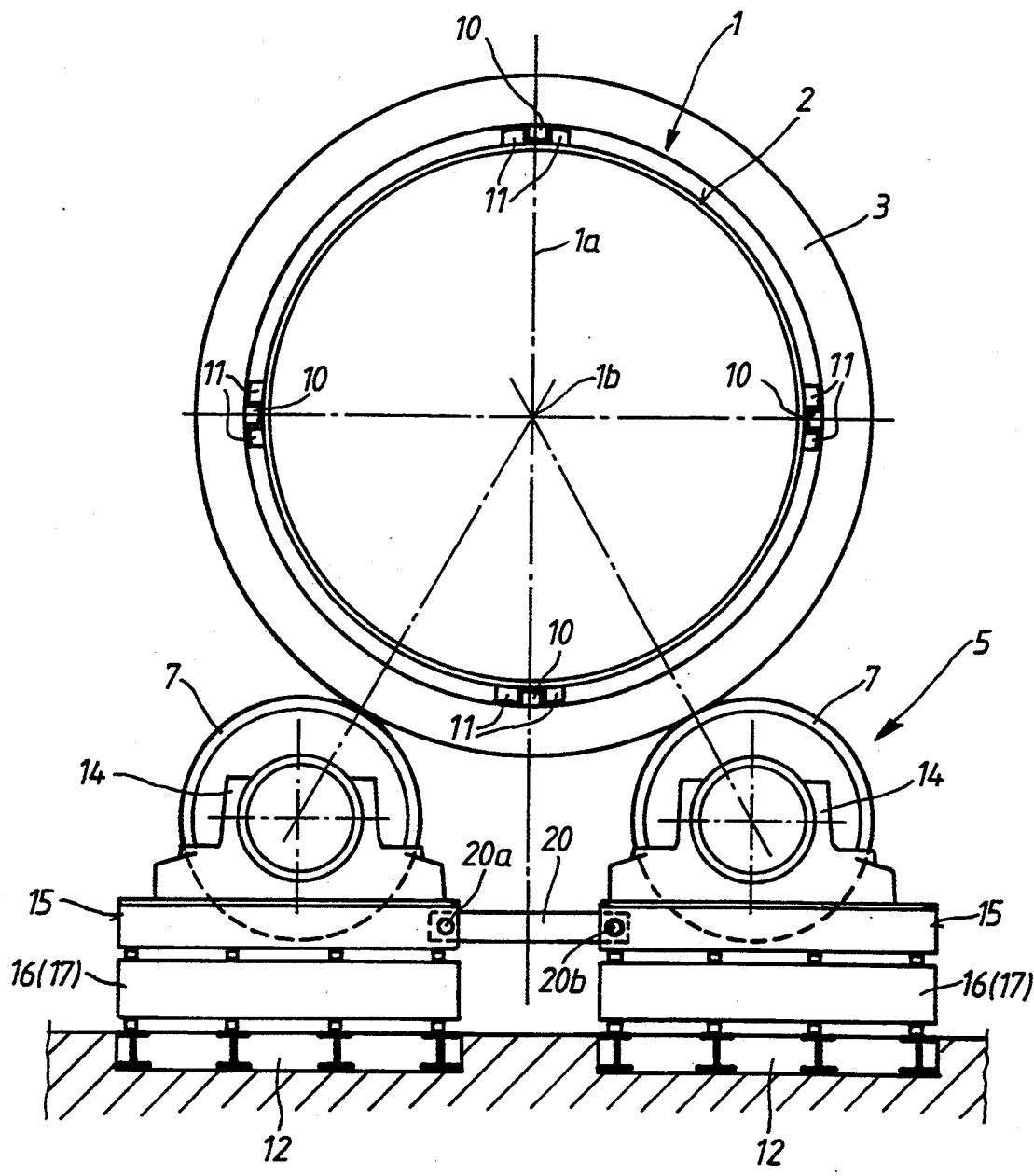
FIG. 2 is a cross-section approximately along the line II—II in FIG. 1.

The tiltable support of each supporting roller 7 in the form of a four-membered linkage as explained above is also illustrated in the cross-sectional view shown in FIG. 2. Here it is particularly clear how the two supporting rollers 7 of one supporting roller stand (in this case the supporting roller stand 5) together with their bedplates 15, stationary foundation plates 12 and the rockers 16, 17 arranged between them (that is to say the associated linkages) are advantageously co-ordinated. However, it is important in this case that the two bedplates 15 of both supporting rollers 7 of this supporting roller stand 5 are connected by at least one connecting link 20 by means of which a constant spacing is maintained between these two bedplates and thus between the two supporting rollers 7 borne by them and expansion forces resulting from the perpendicular dead weight of the two supporting rollers 7 are absorbed by the rotary drum 1. In this case in order to ensure that the independent tiltability of each supporting roller 7 (or each supporting roller bearing thus formed) can be maintained, the connecting link 20 advantageously has pivotal connecting joints 20a, 20b at its connection points to the bedplates 15.

Figure 4:
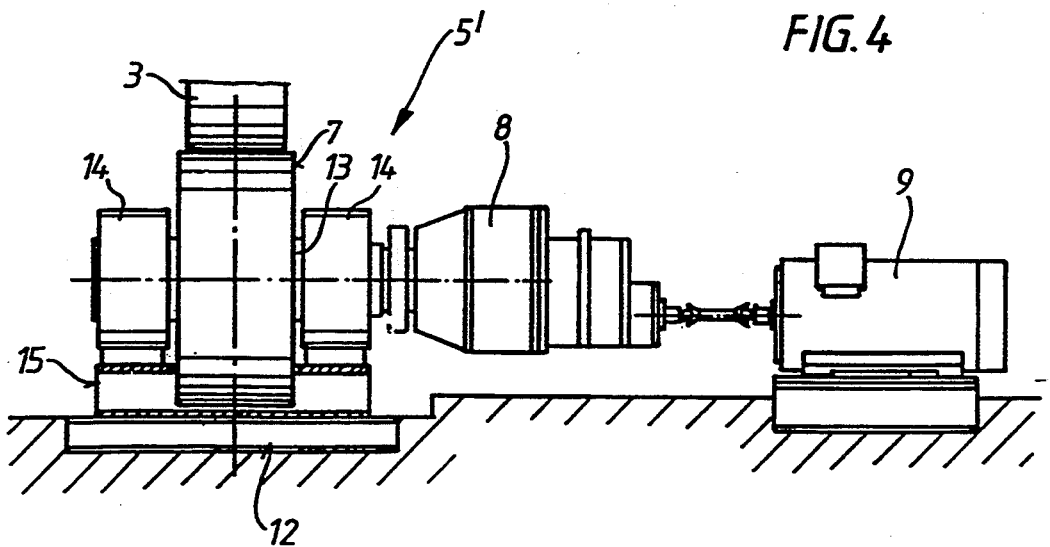
FIG. 4 is a similar detail view to FIG. 3, but with rigidly supported bedplate for the driven supporting roller.

Finally, FIG. 4 shows a further embodiment of the construction of a supporting roller stand 5'. According to this the supporting rollers 7 of at least one supporting roller stand 5' for the riding rings or the associated riding ring 3 can be rigidly supported by their bedplates 15 on a stationary supporting surface in the form of a foundation plate 12. In practice both supporting roller stands of a rotary drum 1 or its supporting rollers 7 will generally be rigidly supported in a similar manner on the stationary foundation plate 12.

In the example shown in FIG. 4 it may again be assumed—as in the example according to FIG. 3—that this is a driven supporting roller 7 which is coupled to a suitable gear assembly 8 which is in turn connected for drive purposes in a suitable manner to a drive motor 9. This supporting roller 7 is also mounted by its roller axle 13 so as to be freely rotatable in bearings 14 which are borne by a bedplate 15 which in turn is fixed directly on the stationary foundation plate 12. This rigid support of the supporting roller 7 or their supporting roller stands on a stationary foundation plate can be chosen above all in cases where no excessive skewing or angular deviations of the riding rings are to be expected during operation.

We claim:

1. A rotary drum comprising an elongate, substantially cylindrical shell having a longitudinal axis; a plurality of riding rings fixed to said shell at longitudinally spaced positions; a corresponding plurality of supporting roller stands each of which includes a pair of rollers in engagement with one of said riding rings and rotatable about an axis parallel to the longitudinal axis of said shell, the rollers of each pair of said rollers being positioned beneath said shell and on opposite sides of the longitudinal axis of said shell; linkage means tiltably supporting the rollers of each of said roller stands for rocking movements about an axis transverse to the longitudinal axis of said shell; and drive means coupled to at least one roller of at least one of said roller stands for rotating said roller and said shell about their respective axes.

2. A rotary drum according to claim 1 wherein said linkage means comprises a pair of links for each of said roller stands, the links of each pair converging upwardly along lines which intersect at a point at which the associated roller contacts a riding ring.

3. A rotary drum according to claim 1 wherein said link means comprises for each roller stand a four member linkage having a stationary base member, a second member vertically spaced from said base member, and a pair of upstanding links spaced longitudinally of the axis of said shell and pivoted to said base member and said second member, said links converging upwardly.

4. A rotary drum according to claim 1 wherein each of riding rings has internal teeth in mesh with teeth on the periphery of said shell.

5. A rotary drum according to claim 1 including connecting link means extending transversely of the axis of said shell and joining the pair of rollers of each of said stands.

6. A rotary drum according to claim 1 wherein said drive means is coupled to one roller only of only one of said roller stands.

7. A rotary drum comprising an elongate, substantially cylindrical shell having a longitudinal axis; a plurality of riding rings fixed to said shell at longitudinally spaced intervals; a corresponding plurality of roller supporting stands each of which includes a pair of rollers, the rollers of each supporting stand underlying and supporting said shell via said riding rings and occupying positions on opposite sides of a vertical plane passing through the longitudinal axis of said shell; and a linkage assembly mounting each of said rollers for tilting movements about an axis transverse to the longitudinal axis of said shell, said linkage assembly comprising a stationary base member parallel to said axis of said shell, a second member vertically spaced from and parallel to said base member, and a pair of links pivoted at corresponding ends to said base member and said second member, said links being spaced from one another longitudinally of said axis of said shell and converging upwardly.

8. A rotary drum according to claim 7 wherein said links converge upwardly along lines which intersect at a point at which the associated roller contacts a riding ring.

9. A rotary drum according to claim 7 including a connecting link coupling the second members of each of said linkage assemblies.

* * * * *